United States Patent [19]

Makino

[11] Patent Number: 4,691,338
[45] Date of Patent: Sep. 1, 1987

[54] LINE SWITCHING CIRCUIT FOR CORDLESS TELEPHONE

[75] Inventor: Masayuki Makino, Tokyo, Japan

[73] Assignee: NEC Corporation, Japan

[21] Appl. No.: 908,573

[22] Filed: Sep. 18, 1986

[30] Foreign Application Priority Data

Sep. 30, 1985 [JP] Japan ................................ 60-218387

[51] Int. Cl.⁴ ............................................. H04Q 7/04
[52] U.S. Cl. ........................................ 379/61; 379/110
[58] Field of Search .................... 379/61, 62, 63, 110, 379/90, 58, 384, 357, 230, 207; 485/38

[56] References Cited

U.S. PATENT DOCUMENTS

| | | | |
|---|---|---|---|
| 4,082,919 | 4/1978 | Day et al. ............................. | 379/62 |
| 4,400,584 | 8/1983 | Vilmur ................................. | 379/61 |
| 4,430,755 | 2/1984 | Nadir .................................... | 379/58 |
| 4,542,262 | 9/1985 | Ruff ..................................... | 379/110 |
| 4,578,540 | 3/1986 | Borg et al. ........................... | 379/40 |
| 4,591,661 | 5/1986 | Benedetto et al. .................. | 379/63 |
| 4,640,987 | 2/1987 | Tsukada .............................. | 379/62 |
| 4,640,988 | 2/1987 | Rorinton .............................. | 379/90 |

*Primary Examiner*—Robert Lev
*Attorney, Agent, or Firm*—Laff, Whitesel, Conte & Saret

FOREIGN PATENT DOCUMENTS 2856019  7/1980  Fed. Rep. of Germany ...... 379/62

[57] ABSTRACT

A line switching circuit for a communications system which includes a cordless telephone and gives priority of use to an ordinary telephone associated with the cordless one is disclosed. The circuit includes a current detector for detecting a current which flows through the telephone, a circuit having a time constant on only one of positive going edges and negative going edges of an output of the current detector, a relay interposed between the cordless telephone and a subscriber's telephone line, and a driver for driving the relay. The relay is closed immediately upon change of the telephone from an off-hook state to an on-hook state and opened with a predetermined time constant upon change of the same from an on-hook state to an off-hook state, whereby a hand-over of conversation between the telephones may be effected without any malfunction even if a ringing signal from a central office is received.

6 Claims, 5 Drawing Figures

LINE SWITCHING CIRCUIT FOR CORDLESS TELEPHONE

BACKGROUND OF THE INVENTION

The present invention relates to a line switching circuit for a telephone system which is connected to a central office by a subscriber's telephone line, particularly a one wherein a plurality of telephones such as a cordless telephone are coupled to a single subscriber's telephone line.

Generally, a cordless telephone consists of a mobile unit and a base unit which are connected to a single subscriber's telephone line together with an ordinary telephone in a branch configuration. The ordinary telephone will hereinafter be referred to simply as a telephone, as distinguished from the cordless telephone. The mobile unit and the base unit of the cordless telephone are connected to each other by a radio link. It is undesirable for a call to be placed on the cordless telephone (mobile unit) while the telephone is in use, since such would interfere with a conversation being held in the latter. In light of this, an effort has been made to give priority to the telephone over the cordless telephone, so that the use of the cordless telephone may be inhibited while the telephone is in use Conférence Européene des Administrations des Postes and des Télécommunication (CEPT) standards. This scheme may be implemented with two different approaches, i.e., one which cuts off the line associated with the cordless telephone while the telephone is in use, and the other which allows the cordless telephone to disconnect itself from a subscriber's line upon detection of a condition of the telephone being used; the latter approach is generally employed since an ordinary telephone is not equipped with the former function.

It is desirable that means for allowing the cordless telephone to connect and disconnect itself from the subscriber's line as stated above be provided with a function of handing over a conversation from the telephone to the cordless telephone as desired. However, a problem with such a scheme is that when the telephone becomes on-hook, the cordless telephone becomes connected to the central office upon the lapse of a certain period of time and not immmediately with the result that the central office erroneously concludes that a conversation has ended, preventing the conversation from being handed over from the telephone to the cordless telephone.

SUMMARY OF THE INVENTION

It is therefore an object of the present invention to provide, in a communications system of the type including a cordless telephone and giving priority to an ordinary telephone over the cordless one, a line switching circuit for the cordless telephone which promotes a smooth hand-over of a conversation between the telephone and the cordless telephone.

It is another object of the present invention to provide a generally improved line switching circuit for a cordless telephone.

In a communications system having a telephone which is connected to a central office by a subscriber's telephone line and a cordless telephone which consists of a mobile unit and a base unit, the base unit being connected to the telephone, the telephone having priority over the cordless telephone with regard to use of the subscriber's telephone line, a line switching circuit for controlling connection between the cordless telephone and the subscriber's telephone line of the present invention comprises a detector for outputting a first and a second voltage when the telephone is on-hook and off-hook, respectively, a signal transferring circuit for transferring an output signal of the detector by delaying it a predetermined period of time if it is derived from a first change from the first voltage to the second voltage and not delaying it if it is derived from a second change from the second voltage to the first voltage, an opening and closing element for controlling connection between the subscriber's line and the base unit, and a control element for controlling the opening and closing element such that the element opens and closes in response to the first change which is delayed by the predetermined period of time and the second charge which is not delayed, respectively, which are outputted by the signal transferring circuit.

The above and other objects, features and advantages of the present invention will become more apparent from the following detailed description taken with the accompanying drawings.

DESCRIPTION OF THE PREFERRED EMBODIMENT

Figure 1:
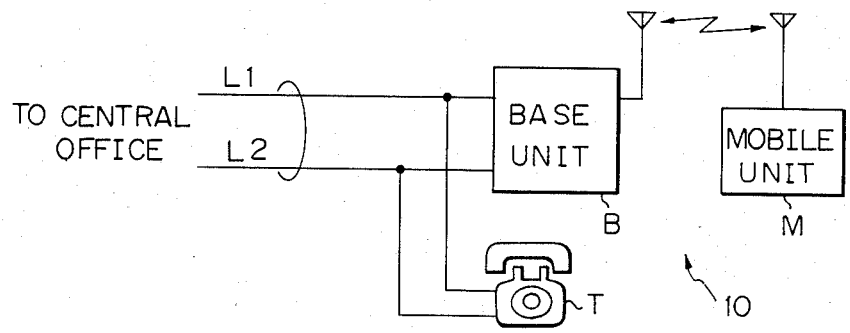
FIGS. 1 and 2 are block diagrams showing a prior art cordless telephone system.

To better understand the present invention, a brief reference will be made to a prior art cordless telephone, shown in FIG. 1. A cordless telephone system of FIG. 1, generally 10, consists of a mobile unit M and a base unit. The mobile unit M and base unit B are coupled to a subscriber's lines $L_1$ and $L_2$ paired with an ordinary telephone T in a branch configuration. The two units M and B of the cordless telephone are connected by a radio link to each other. In the system 10, when a call is originated on the cordless telephone (mobile unit M) while the telephone T is in use, it interferes with a conversation being held on the telephone T. The current trend in the art is, therefore, giving priority to the telephone T so that the use of the cordless telephone may be inhibited while the telephone T is being used (CEPT standards). This system may be implemented with two different approaches, i.e., one which cuts off the line associated with the cordless telephone while the telephone is in use, and the other which allows the cordless telephone to disconnect itself from the subscriber's lines $L_1$ and $L_2$ upon detection of a condition of the telephone T being used; the latter approach is generally employed since an ordinary telephone set is not equipped with the former function.

Figure 2:
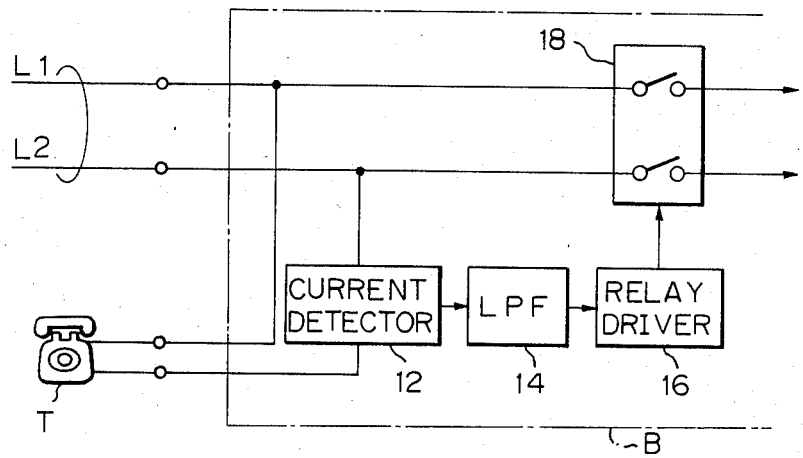

Referring to FIG. 2, a possible arrangement which allows the cordless telephone to connect and disconnect itself from the subscriber's lines $L_1$ and $L_2$ is shown. When the telephone T has become off-hook, the resultant current is detected by a photocoupler or like current detector 12. The output of the current detector 12 is routed through a low-pass filter (LPF) 14 to a relay driver 16 which then drives a relay 18, whereby the cordless telephone is cut off from the subscriber's lines $L_1$ and $L_2$. It is to be noted that the LPF 14 serves to prevent the relay 18 from malfunctioning when a ringing signal whose frequency is 16 or 25 hertz has been received from a central office.

A problem with the system of FIG. 2 is that an attempt to provide it with a function of handing over a conversation from the telephone T to the cordless telephone fails since, upon on-hook of the telephone T, the relay 18 is not driven immediately, i.e., the cordless telephone becomes connected to the central office only after a certain period of time.

Figure 3:
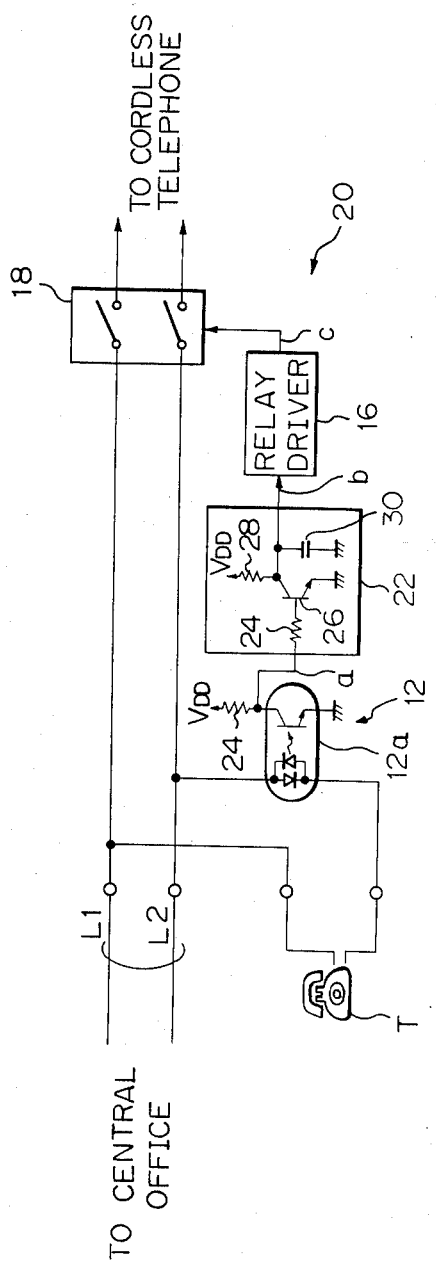
FIG. 3 is a schematic diagram of a cordless telephone system embodying the present invention.
Figure 4:
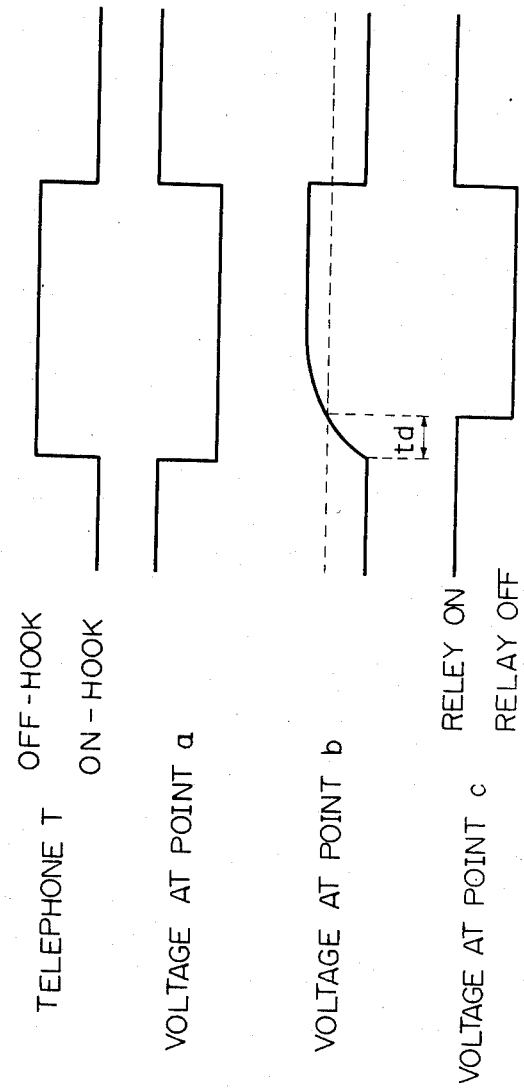
FIGS. 4 and 5 are timing charts representative of operation of the system as shown in FIG. 3.

Referring to FIG. 3, a line switching circuit for a cordless telephone in accordance with the present invention is shown and generally designated by the reference numeral 20. In FIG. 3, the same or similar structural elements as those shown in FIG. 2 are designated by like reference numerals. As shown, the circuit 20 includes a current detector 12 adapted to detect a line current when a telephone T is brought into an off-hook condition. In this particular embodiment, the current detector 12 is implemented with a photocoupler 12a by way of example. A delay circuit 22 responds only to negative going edges of an output of the current detector 12. A relay driver 16 functions to control, in response to an output of the delay circuit 22, a relay 18 which connects and disconnects a cordless telephone from a subscriber's telephone lines $L_1$ and $L_2$. The photocoupler 12a is connected to a power source $V_{DD}$ via a resistor 24. The delay circuit 22 consists of a resistor 24, a transistor 26, a resistor 28 (having a resistance value of RA), and a capacitor 30 (having a capacitance of CA).

In operation, when the handset of the fixed telephone T is picked up, i.e., when the state of the telephone T is changed from on-hook to off-hook, a current which then flows through the telephone T is detected by the photocoupler 12a. As a result, a voltage appearing at a point a is changed from a high (H) level to a low (L) level while a voltage appearing at a point b is changed from an L level to an H level with a certain time constant due to the delay circuit 22. The H level voltage at the point b is applied to the relay driver 16 which, therefore, opens the relay 18 upon the lapse of a certain period of time after the detection of the current through the telephone T. Consequently, the cordless telephone is cut off from the subscriber's lines $L_1$ and $L_2$.

On the other hand, when it is desired to hand over a conversation being held between the telephone T and the other party to the cordless telephone, the state of the telephone T changes from off-hook to on-hook. At this instant, the output of the photocoupler 12a appearing at the point a is changed from an L level to an H level causing the voltage at the point b to immediately change from H level to L level. This causes the relay driver 16 to close the relay 18 immediately so that despite the on-hook state of the telephone T the conversation is immediately transferred from the telephone T to the cordless telephone without interruption.

The delay time td from the instant of the change of the state of the telephone T from on-hook to off-hook to the actuation of the relay 18 is dependent on the product of the resistance RA of the resistor 28 and the capacitance CA of the capacitor 30 which are included in the delay circuit 22. It is necessary for such a product or constant, RA·CA, to be great enough to prevent the relay 18 from malfunctioning in response to a received signal, or ringing signal, from the central office. Nevertheless, should it be excessively great, the period of time before the relay 18 becomes open and, therefore, the period of time before the telephone T and the cordless telephone becomes connected in parallel would be lengthened.

Figure 5:
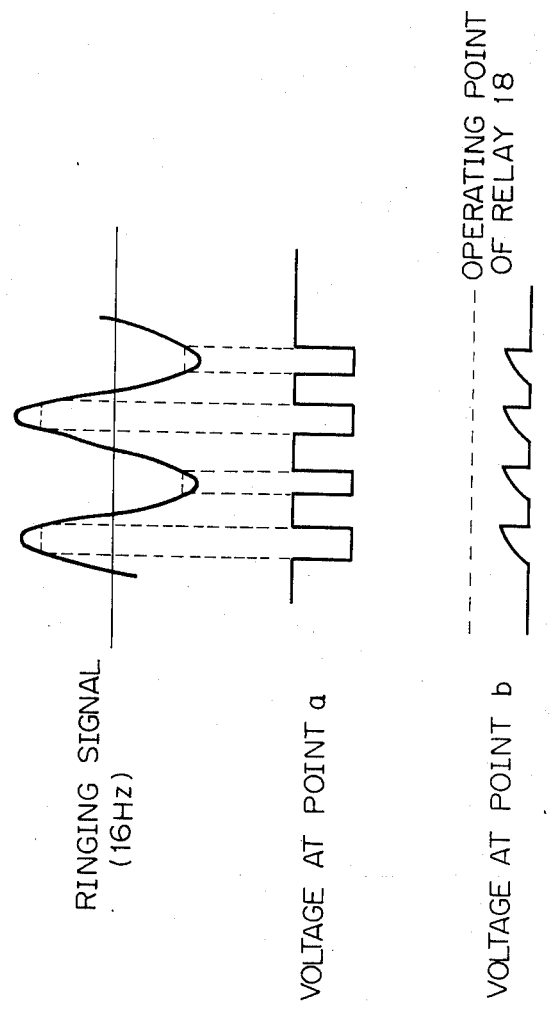

FIG. 5 shows a relationship between the received signal, or ringing signal, and the voltage appearing at the points a and b. As shown, the previously mentioned constant RA·CA has to be so predetermined as not to reach the operating point of the relay 18 while the current detector 12 is operating in high instantaneous voltage portions of the ringing signal. In the specific example shown in FIG. 5, because the ringing signal (16 hertz) crosses the zero level at every 31.25 milliseconds, i.e., ½(period)×1/16 (hertz)=31.25, malfunctions of the relay 18 can be eliminated only if the delay time td is longer than 31.25 milliseconds.

In summary, it will be seen that, in a communications system including a cordless telephone and giving priority to an ordinary telephone which is associated with the cordless one, a line switching circuit for the cordless telephone of the present invention allows a hand-over of a conversation to be performed between the telephone and the cordless telephone without the possibility of malfunction otherwise brought about by a ringing signal from a central office.

Various modifications will become possible for those skilled in the art after receiving the teachings of the present disclosure without departing from the scope thereof.

What is claimed is:

1. In a communications system having a telephone which is connected to a central office by a subscriber's telephone line and a cordless telephone which comprises a mobile unit and a base unit, said base unit being connected to said telephone, said telephone having priority over said cordless telephone with regard to use of said subscriber's telephone line, a line switching circuit for controlling connection between said cordless telephone and said subscriber's telephone line, comprising:

detector means for outputting a first and a second voltages when said telephone is on-hook and off-hook, respectively;
   signal transferring means for transferring an output signal of said detector means by delaying said output signal a predetermined period of time if said output signal is derived from a first change from said first voltage to said second voltage and not delaying said output signal if said output signal is derived from a second charge from said second voltage to said first voltage;
   opening and closing means for controlling connection between said subscriber's line and said base unit; and
   control means for controlling said opening and closing means such that said opening and closing means opens and closes in response to said first change which is delayed by said predetermined period of time and said second change which is not delayed, respectively, which are outputted by said signal transferring means.

2. A line switching circuit as claimed in claim 1, wherein said detector means comprises a current detector responsive to a current which flows through said telephone.

3. A line switching current as claimed in claim 2, wherein said current detector comprises a photocoupler.

4. A line switching circuit as claimed in claim 1, wherein said opening and closing means comprises a relay, and said control means comprises a relay driver for driving said relay.

5. A line switching circuit as claimed in claim 1, wherein said signal transferring means comprises an integration circuit having a time constant which is equal to said predetermined period of time and delivering an output of said integration circuit as an output of said signal transferring means, and a switching element for switching said integration circuit such that said integration circuit is charged and discharged in response to said first voltage and said second voltage from said detector means, respectively.

6. A line switching circuit as claimed in claim 5, wherein said switching element comprises a transistor.

* * * * *